US011438332B2

(12) United States Patent
Hassani et al.

(10) Patent No.: US 11,438,332 B2
(45) Date of Patent: Sep. 6, 2022

(54) DISTRIBUTED VEHICLE NETWORK ACCESS AUTHORIZATION

(71) Applicant: Ford Global Technologies, LLC, Dearborn, MI (US)

(72) Inventors: Ali Hassani, Ann Arbor, MI (US); Clifford Anthony Bailey, Canton, MI (US); Robert D. Bedard, Allen Park, MI (US); Willie Ham, Farmington Hills, MI (US); Michael Kruntovski, Beverly Hills, MI (US); Lauren Peng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 16/560,448

(22) Filed: Sep. 4, 2019

(65) Prior Publication Data

US 2021/0067513 A1 Mar. 4, 2021

(51) Int. Cl.
*H04L 9/40* (2022.01)
*H04L 9/32* (2006.01)
(Continued)

(52) U.S. Cl.
CPC ............ *H04L 63/10* (2013.01); *H04L 9/3234* (2013.01); *H04L 9/3271* (2013.01); *H04L 67/10* (2013.01);
(Continued)

(58) Field of Classification Search
CPC ..... H04L 63/10; H04L 9/3234; H04L 9/3271; H04L 67/10; H04L 67/12; H04L 2209/84; H04L 2209/38; H04L 2209/80; H04L 9/3297; H04L 9/3239; H04L 67/1097; H04L 63/0807; H04W 12/009; H04W 12/08

See application file for complete search history.

(56) References Cited

U.S. PATENT DOCUMENTS 9,767,689 B1 * 9/2017 Cain .................... G08G 1/0133
10,135,609 B2 11/2018 Bibera et al.
(Continued)

FOREIGN PATENT DOCUMENTS

CN 108366115 A 8/2018
GB 2562054 A 7/2018

*Primary Examiner* — Taghi T Arani
*Assistant Examiner* — Blake I Narramore
(74) *Attorney, Agent, or Firm* — Brandon Hicks; Bejin Bieneman PLC

(57) ABSTRACT

A system includes a first plurality of blockchain nodes including first network nodes external to a vehicle and second network nodes internal to the vehicle, the first plurality of blockchain nodes maintaining a first distributed blockchain ledger; and a first computing device. The first computing device is programmed to transmit a first request to the first plurality of blockchain nodes requesting access to a vehicle network via a communications access port in the vehicle; demonstrate a first proof of work by responding to a second request from the first plurality of blockchain nodes; and receive, based on a first majority of the first network nodes and the second network nodes in the first plurality of blockchain nodes accepting the first request, first authorization specifying access to the vehicle access via the communications access port.

18 Claims, 6 Drawing Sheets

(51) Int. Cl.
  *H04W 12/00*  (2021.01)
  *H04L 67/10*  (2022.01)
  *H04L 67/12*  (2022.01)
(52) U.S. Cl.
  CPC .......... *H04L 67/12* (2013.01); *H04W 12/009*
    (2019.01); *H04L 2209/38* (2013.01); *H04L*
    *2209/80* (2013.01); *H04L 2209/84* (2013.01)

(56) References Cited

U.S. PATENT DOCUMENTS

| | | | |
|---|---|---|---|
| 10,699,574 B1* | 6/2020 | Zeryihun | H04L 9/3268 |
| 10,897,469 B2* | 1/2021 | Hirshberg | G06F 15/16 |
| 2014/0012458 A1* | 1/2014 | Park | G07C 5/0808 |
| | | | 701/31.4 |
| 2015/0071115 A1* | 3/2015 | Neff | H04L 43/50 |
| | | | 370/254 |
| 2016/0098869 A1* | 4/2016 | Rood | G07C 5/0808 |
| | | | 701/32.7 |
| 2018/0131700 A1* | 5/2018 | Ando | H04L 63/162 |
| 2018/0197172 A1 | 7/2018 | Coburn et al. | |
| 2018/0343126 A1 | 11/2018 | Fallah et al. | |
| 2019/0259274 A1* | 8/2019 | Avery | H04L 67/12 |
| 2019/0268376 A1* | 8/2019 | Park | H04L 9/0819 |
| 2019/0287410 A1* | 9/2019 | Fukuhara | G06Q 10/20 |
| 2019/0312892 A1* | 10/2019 | Chung | G06F 21/554 |
| 2020/0081699 A1* | 3/2020 | Majed | G06F 8/65 |
| 2020/0216097 A1* | 7/2020 | Galula | G06F 21/52 |
| 2020/0372601 A1* | 11/2020 | Lee | B60L 53/51 |
| 2020/0388091 A1* | 12/2020 | Ropel | H04L 9/0637 |
| 2020/0409719 A1* | 12/2020 | Daniel | G06F 9/546 |
| 2021/0027186 A1* | 1/2021 | Sanchirico | H04L 9/0643 |
| 2021/0042361 A1* | 2/2021 | Leise | G06Q 30/018 |
| 2021/0065168 A1* | 3/2021 | Liu | G06F 21/64 |
| 2021/0065469 A1* | 3/2021 | Dutta | G08G 1/205 |

\* cited by examiner

DISTRIBUTED VEHICLE NETWORK ACCESS AUTHORIZATION

BACKGROUND

The number of uses of a communications access port on a vehicle such as an on-board diagnostics (OBD) port is increasing as vehicles become more intelligent. In addition to diagnostic and programming operations, the communications access port can be used, for example, for aftermarket connectivity devices and driving behavior reporting devices. These devices may present a potential security risk. A system and process for identifying and authorizing devices to access a vehicle network via a communications access port may prove beneficial.

DETAILED DESCRIPTION

Figure 1:
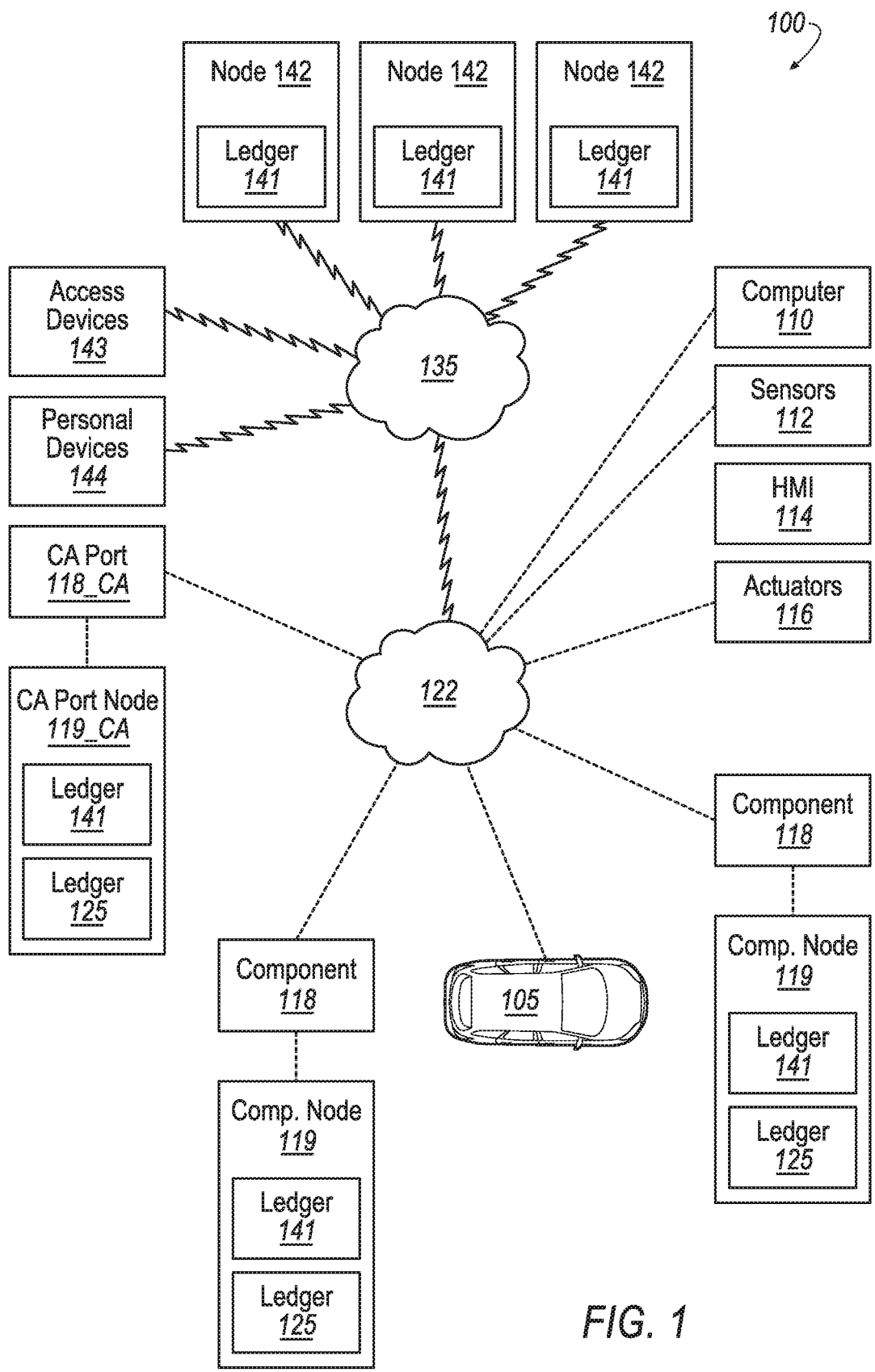
FIG. 1 is a block diagram illustrating an example system to identify and authorize devices for communications access port access.

Disclosed is a system comprising: a first plurality of blockchain nodes including first network nodes external to a vehicle and second network nodes internal to the vehicle, the first plurality of blockchain nodes maintaining a first distributed blockchain ledger; and a first computing device, the first computing device including a processor and a memory. The memory includes instructions such that the processor is programmed to: transmit a first request to the first plurality of blockchain nodes requesting access to a vehicle network via a communications access port in the vehicle for the first computing device or another computing device; demonstrate a first proof of work by responding to a second request from the first plurality of blockchain nodes; and receive, based on a first majority of the first network nodes and the second network nodes in the first plurality of blockchain nodes accepting the first request, first authorization specifying access to the vehicle network via the communications access port.

In the system, access to the vehicle network via the communications access port can include at least one of (1) access to at least some data on the vehicle network and (2) access to communicate with at least one vehicle system on the vehicle network.

In the system, the first plurality of blockchain nodes can be programmed to add a data block to the first distributed blockchain ledger recording the first authorization based on the first majority of the first network nodes and the second network nodes accepting the first proof of work.

In the system, the second request from the first plurality of blockchain nodes can be a hash puzzle.

In the system, accepting the first request can include accepting the first proof of work.

The system can further include a second plurality of blockchain nodes including the second network nodes internal to the vehicle and not including the first network nodes external to the vehicle, the second plurality of blockchain nodes maintaining a second distributed blockchain ledger; and a second computing device recognized as trusted by at least one node in the second plurality of blockchain nodes, the second computing device including a second processor and a second memory. The second memory can include instructions such that the processor is programmed to transmit a third request to the second plurality of blockchain nodes requesting access to the vehicle network via the communications access port; demonstrate a second proof of work by responding to a fourth request from the second plurality of blockchain nodes; receive a cryptographic token from one of the second network nodes based on the one of the second network nodes providing a third proof of work by responding to the third request from the first plurality of blockchain nodes; and receive, based on (1) a second majority of the second network nodes in the second plurality of blockchain nodes accepting the third request, and (2) the received cryptographic token, second authorization authorizing access to the vehicle network via the communications access port.

In the system, the second plurality of blockchain nodes, based on (1) the second majority of the second network nodes in the second plurality of blockchain nodes accepting the third request, and (2) the received cryptographic token, can be programmed to add a data block to the second distributed blockchain ledger recording the second authorization.

In the system, transmitting the third request to the second plurality of blockchain nodes can be based on the first majority of the first network nodes and the second network nodes in the first plurality of blockchain nodes not accepting the first proof of work.

In the system, to establish that the second computing device is recognized as trusted by the at least one node on the second plurality of blockchain nodes, the second processor can be programmed to transmit at least one of (1) an identifier of the second computing device recognized by the at least one node on the second plurality of blockchain nodes or (2) a first digital key matching to or pairing with a second digital key stored on the at least one node on the second plurality of blockchain nodes.

In the system, the second authorization can be limited in duration, and the first plurality of blockchain nodes can further be programmed to: monitor activity of the second computing device during the duration of the second authorization; and adjust or extend the specified access to the vehicle network via the communications access port based on determining that the activity of the second computing device remained within a predetermined range of activities during the duration of the second authorization.

Further disclosed is a method comprising: transmitting, by a first computing device, a first request to a first plurality of blockchain nodes requesting access to a vehicle network via a communications access port in a vehicle for the first computing device or another computing device, wherein the first plurality of blockchain nodes includes first network nodes external to the vehicle and second network nodes included in the vehicle and the first plurality of nodes maintains a first distributed blockchain ledger; demonstrating a first proof of work by responding to a second request from the first plurality of blockchain nodes; and receiving, based on a first majority of the first network nodes and the second network nodes in the first plurality of blockchain nodes accepting the first request, first authorization specifying access to the vehicle network via the communications access port.

In the method, access to the vehicle network via the communications access port can include at least one of (1) access to at least some data on the vehicle network and (2) access to communicate with at least one vehicle system on the vehicle network.

In the method, each of the first plurality of blockchain nodes can be programmed to add a data block to the first distributed blockchain ledger recording the first authorization based on the first majority of the first network nodes and the second network nodes accepting the first proof of work.

In the method, the second request from the first plurality of blockchain nodes can be a hash puzzle.

In the method, accepting the first request can include accepting the first proof of work.

The method can further include, transmitting, by a second device recognized as trusted by at least one node in a second plurality of blockchain nodes, a third request to the second plurality of blockchain nodes requesting access to the vehicle network via the communications access port, wherein the second plurality of blockchain nodes includes the second network nodes included in the vehicle and does not include the first network nodes external to the vehicle and the second plurality of blockchain nodes maintains a second distributed blockchain ledger; demonstrating a second proof of work by responding to a fourth request from the second plurality of blockchain nodes; receiving a cryptographic token from one of the second network nodes based on the one of the second network nodes providing a third proof of work by responding to the third request from the first plurality of blockchain nodes; and receiving, based on (1) a second majority of the second network nodes in the second plurality of blockchain nodes accepting the third request, and (2) the received cryptographic token, second authorization authorizing access to the vehicle network via the communications access port.

In the method, the second plurality of blockchain nodes, based on (1) the second majority of the second network nodes in the second plurality of blockchain nodes accepting the third request, and (2) the received cryptographic token, can be programmed to add a data block to the second distributed blockchain ledger recording the second authorization.

In the method, transmitting the third request to the second plurality of blockchain nodes is based on the first majority of the first network nodes and the second network nodes in the first plurality of blockchain nodes not accepting the first proof of work.

In the method, to establish that the second computing device is recognized as trusted by the at least one node on the second plurality of blockchain nodes, the second processor can be programmed to transmit at least one of (1) an identifier of the second computing device recognized by the at least one node on the second plurality of blockchain nodes or (2) a first digital key matching to or pairing with a second digital key stored on the at least one node on the second plurality of blockchain nodes.

The method can further include monitoring, by the first plurality of blockchain nodes, activity of the second computing device during the duration of the second authorization, wherein the second authorization is limited in duration; and adjusting or extending the specified access to the vehicle network via the communications access port based on determining that the activity of the second computing device remained within a predetermined range of activities during the duration of the second authorization.

A plurality of global blockchain nodes generates and maintains a global blockchain access ledger for recording access authorization to access a vehicle network via a communications access port. Accessing the vehicle network, as used herein, means to access at least some data on the vehicle network via the communications access device and/or to communicate with at least one vehicle system on the vehicle network via the communications access device. The term "communicate with at least one vehicle system on the vehicle network" as used herein includes communicating with at least one of any vehicle system, subsystem, component, sensor, human-machine interface, actuator and/or other vehicle devices communicatively coupled on the vehicle network. The plurality of global blockchain nodes is a group of computing devices referred to as nodes, communicatively coupled in a network, each node hosting a distributed ledger. As non-limiting examples, the network may be a peer-to-peer network or a peer-to-peer network with a supervisory node. Other network topologies may also be used to couple the plurality of global blockchain nodes. The nodes authorized to participate in the plurality of global blockchain nodes are listed in the global blockchain access ledger. Nodes in the plurality of global blockchain nodes include computing devices external to the vehicle and component nodes included in the vehicle.

The vehicle includes a separate plurality of local blockchain nodes that maintains a local (i.e., local to the vehicle) blockchain access ledger. The plurality of local blockchain nodes includes a group of computing devices referred to as nodes, which are communicatively coupled in a network. As non-limiting examples, the network may be a peer-to-peer network or a peer-to-peer network with a supervisory node. Other types of network topologies may also be used to connect the plurality of global blockchain nodes. The nodes authorized to participate in the plurality of local blockchain nodes are listed in the local blockchain access ledger. Nodes in the plurality of local blockchain nodes may include the component nodes included in the vehicle and may further include additional nodes included in other vehicle systems, subsystems, components, etc.

Users access the vehicle network via the communications access port via access devices. An access device, as used herein, is a computing device requesting to modify the global blockchain access ledger and/or the local blockchain access ledger in order to record authorization to access to the vehicle network via the communications access port. The requested authorization may be for the access device, or for another device represented by the access device. For example, the access device may request to establish access to the vehicle network via the communications access port and to be entered in the global blockchain access ledger. The access device may be communicatively coupled to the vehicle network, for example, to a CAN bus in the vehicle, and provide an interface for a user to send and/or receive messages to devices in the plurality of global blockchain nodes. To establish access to the vehicle network via the communications access port, the access devices connect to the vehicle network and submit a request for access to the vehicle network via the communications access port. Nodes on the plurality of global blockchain nodes, based on a majority vote, can grant access to the vehicle network via the communications access port to the access device.

As a back-up method for obtaining access to the vehicle network via the communications access port, a personal device can request access to the vehicle network via the communications access port based on the personal device demonstrating trustworthiness with a node (e.g., a component node) in the plurality of local blockchain nodes and authorization from at least one node in the plurality of global blockchain nodes that is external to the vehicle. For example, the personal device may present a digital key matching to or pairing with a digital key on the node, or the personal device may have an identifier, signature and/or digital fingerprint listed on an authorization list for the component node in the plurality of local blockchain nodes.

Authorization to access the vehicle network via the communications access port can be stored as data blocks in the global blockchain access ledger. The global blockchain access ledger, as discussed herein, is a distributed database including a blockchain storing one or more data blocks identifying devices with authorization to access the vehicle network via the communications access port and levels of access to the vehicle network via the communications access port access for the devices. "Distributed" in this context means that copies of the database are maintained by multiple nodes in the plurality of global blockchain nodes. The terms "level of access" and "access level" as used herein mean a specification of which components, subsystems and/or systems on the vehicle network and which data on the vehicle network can be accessed by the device via the communications access port, specification of a type of access (read only, limited write, full write, etc.), and specification of a period of time of access (continuous, for a fixed time period, until a vehicle next stops operation, etc.) The data blocks stored within the global blockchain access ledger are linked in chains by hashes.

A blockchain stores data by generating hashes for blocks of data. A hash in the present context is a one-way encryption of data, i.e., using a hash function, having a fixed number of bits. An example of hash encryption is SHA-256. The hashes provide links to blocks of data by identifying locations of the respective blocks of data in storage (digital memory), for example by use of an association table mapping the hashes of the storage locations. An association table provides a mechanism for associating the hash (which may also be referred to as a hash key) with an address specifying a physical storage device either in a vehicle or a stationary location. The hash for the block of data further provides a code to verify the data to which the hash links. Upon retrieving the block of data, a computer can recompute the hash of the block of data and can compare the resulting hash with the hash providing the link. In the case that the recomputed hash matches the linking hash, the computer can determine that the block of data is unchanged. Conversely, a recomputed hash that does not match the linking hash indicates that the block of data or the hash has been changed, for example through corruption or tampering. The hash providing the link to a block of data may also be referred to as a key or a hash key. An example structure of a vehicle blockchain component usage register is discussed below in reference to FIG. 4.

Figure 2:
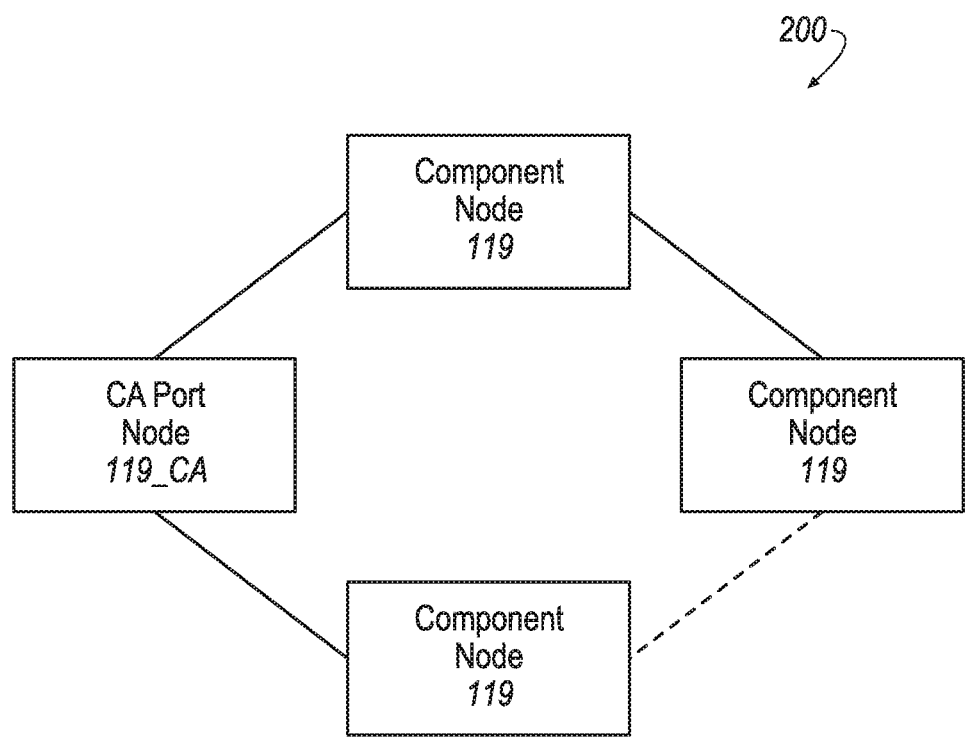
FIG. 2 is a diagram of an example plurality of local (in-vehicle) blockchain nodes for identifying and authorizing devices.
Figure 3:
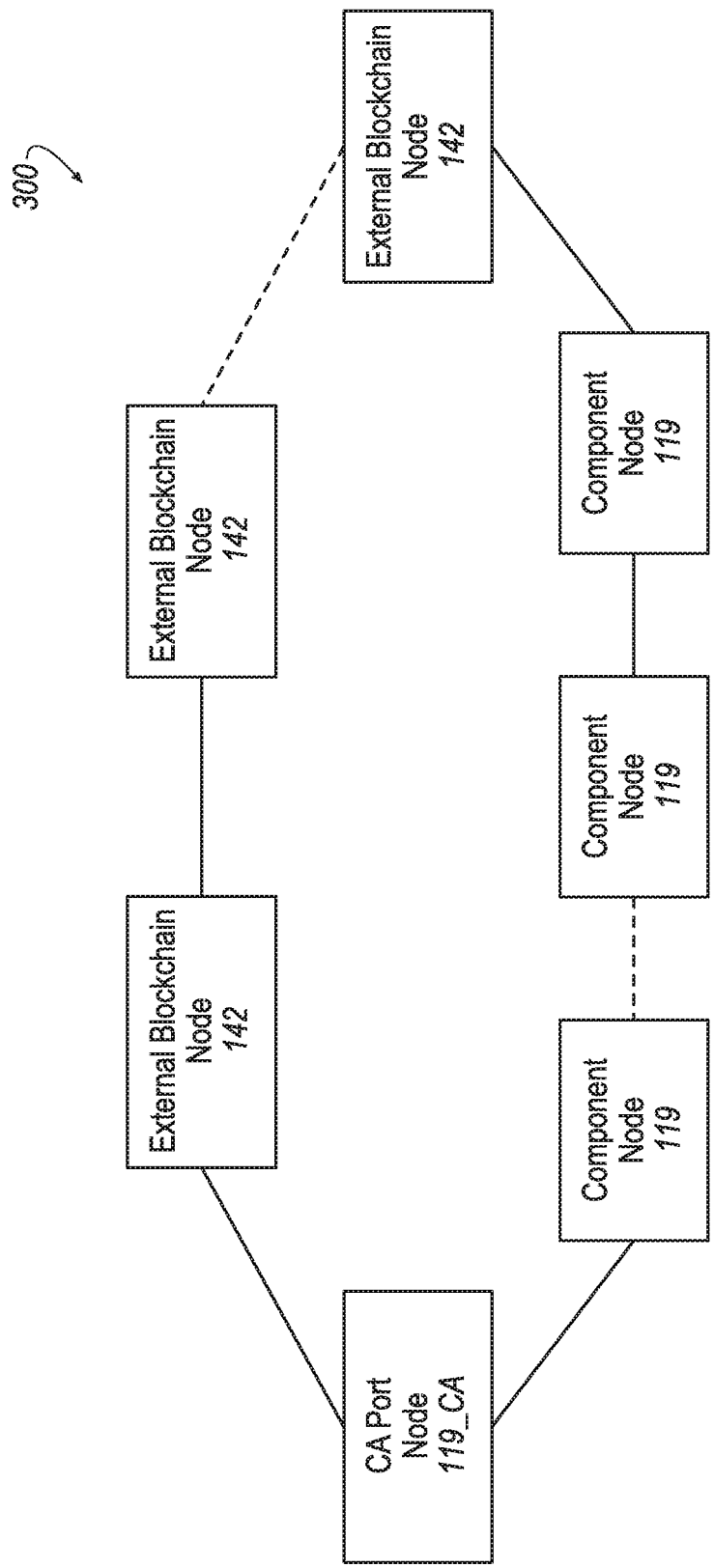
FIG. 3 is a diagram of an example plurality of global blockchain nodes for identifying and authorizing devices.

FIG. 1 is a block diagram of an example system 100, and FIGS. 2-3 include further detail with respect to certain elements in the system 100, that includes a vehicle 105, and one or more external blockchain nodes 142 communicatively coupled by a network 135. The system 100 may further include an access device 143 and/or a personal device 144 communicatively coupled to the network 135 and/or vehicle communications network 122.

The network 135 communicatively couples a plurality of global blockchain nodes 300 (FIG. 3). The plurality of global blockchain nodes 300 maintains a global blockchain access ledger 141 that records authorization and access levels of computing devices such as external blockchain nodes 142, access devices 143, personal devices 144, components 118, etc., to an communications access port 118_CA on the vehicle 105. As shown in FIG. 3, nodes in the plurality of global blockchain nodes 300 include the one or more external blockchain nodes 142, and one or more component nodes 119. As discussed further below, each external blockchain node 142 and each component node 119 in the plurality of global blockchain nodes 300 maintains a copy of the global blockchain access ledger 141. In some cases, an access device 143 and/or personal device 144 may also be a node in the plurality of global blockchain nodes 300.

Each vehicle 105 includes a computer 110, sensors 112, an HMI 114, actuators 116, the vehicle components 118, communicatively coupled by a vehicle communications network 122. Vehicle components 118 include the communications access port 118_CA. The vehicle communications network 122 communicatively couples a plurality of local blockchain nodes 200. As shown in FIG. 2, nodes in the plurality of local blockchain nodes 200 includes one or more component nodes 119 and may include the communications access port node 119_CA. The plurality of local blockchain nodes 200 maintains a local blockchain access ledger 125. The local blockchain access ledger 125 records authorization and access levels for devices to the communications access port 118_CA on the vehicle 105. As discussed further below, each component node 119 in the plurality of local blockchain nodes 200 maintains a copy of the local blockchain access ledger 125.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via the vehicle communications network 122, more than one processor, e.g., included in electronic controller units (ECUs) or the like included in the vehicle 105 for monitoring and/or controlling various vehicle components 118, e.g., a transmission controller, a brake controller, a steering controller, etc. The vehicle computer 110 is generally arranged for communications on the vehicle communication network 122 that can include one or more busses in the vehicle 105 such as a controller area network (CAN) or the like, and/or other wired and/or wireless mechanisms.

Via the vehicle communications network 122, the vehicle computer 110 may transmit messages to various devices in the vehicle 105 and/or receive messages (e.g., CAN messages) from the various devices, e.g., sensors 112, a human machine interface (HMI) 114, an actuator 116, the vehicle components 118, etc. Alternatively, or additionally, in cases where the vehicle computer 110 actually comprises a plurality of devices, the vehicle communications network 122 may be used for communications between devices represented as the vehicle computer 110 in this disclosure. Further, as mentioned below, various controllers and/or sensors 112 may provide data to the vehicle computer 110 via the vehicle communications network 122.

The sensors 112 may include a variety of devices such as are known to provide data to the vehicle computer 110. For example, the sensors 112 may include Light Detection And Ranging (LIDAR) sensor(s) 112, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 112 fixed to vehicle 105 bumpers may provide data to provide locations of the objects, second vehicles 105, etc., relative to the location of the vehicle 105. The sensors 112 may further alternatively or additionally, for example, include camera sensor(s) 112, e.g. front view, side view, etc., providing images from an area surrounding the vehicle 105.

The vehicle 105 further includes a human-machine interface (HMI) 114. The human-machine interface (HMI) 114 includes input devices such as knobs, buttons, switches, pedals, levers, touch screens, microphones, etc. that can receive input from a user. For example, the HMI 114 may include a brake pedal, an accelerator pedal, and a steering wheel for receiving inputs from a user for controlling the vehicle 105. The input devices may include sensors 112 to detect user inputs and provide user input data to the computer 110. For example, the steering wheel may include sensors 112 to detect an angle of rotation of the steering wheel and provide the data to the computer 110.

The HMI 114 further includes output devices such as displays (including touch screen displays), speakers, lights, etc. that output signals or data to the user. The HMI 114 is coupled to the vehicle communications network 122 and can send and/or receive messages to/from the computer 110 and other vehicle sub-systems.

The actuators 116 are implemented via circuits, chips, or other electronic and or mechanical components that can actuate various vehicle subsystems in accordance with appropriate control signals as is known. The actuators 116 may be used to control components 118, including braking, acceleration, and steering of a vehicle 105.

A vehicle component 118 in the context of this disclosure is one or more hardware assemblies, including an electronic control unit (ECU) including one or more processors and memory including instructions for programming the processors, adapted to perform a mechanical or electro-mechanical function or operation—such as moving the vehicle 105, slowing or stopping the vehicle 105, steering the vehicle 105, etc. Non-limiting examples of vehicle components 118 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, a communications access port 118_CA, etc.

Vehicle components 118 may include a component node 119. The component node 119 is a computing device including processor and memory, which may be included in an electronic control unit. The component node 119 is programmed to operate as a node in the plurality of global blockchain nodes 300 and is further programmed to operate as a node in the plurality of local blockchain nodes 200. The component nodes 119 may include programming to provide proof of work for participating as a node in a blockchain maintenance group. Proof of work as used herein is a requirement that a computation, typically requiring extensive computational resources (i.e., significant processing power and/or significant processing time), be performed to facilitate a transaction (e.g., adding a block to a blockchain ledger). As an example, a proof of work may be a requirement to identify a number that, when added to a block of data, modifies the data such that a hash of the data has a specific quality, such as a number of leading zeros. Providing proof of work may include responding to a request from the blockchain maintenance group. The request may include, for example, a data block to be modified, a hash function to be used to generate the hash of the data block and the specific result required from the proof of work. Additionally or alternatively, performing proof of work may include solving other types of digital puzzles requiring extensive computational resources.

The vehicle components 118 include the communications access port 118_CA. The communications access port 118_CA includes a communications access port node 119_CA programmed to operate as a node in the plurality of global blockchain nodes 300 and plurality of local blockchain nodes 200. The communications access port 118_CA, as used herein, is an electronic control module that controls access to on-board diagnostics on the vehicle 105. Examples of the communications access port 118_CA may include, but are not limited to different generations of OBD technology, such as OBD, OBD-2, etc.

The vehicle communications network 122, as used herein, is defined as one or more mechanisms for wired or wireless communications between systems and sub-systems of the vehicle 105. The vehicle communications network 122 can include, for example, one or more vehicle communications busses and one or more wireless communications networks. Non-limiting examples of vehicle communications busses include Controller Area Network (CAN) busses, Local Interconnect Network (LIN) busses, and Ethernet networks. Non-limiting examples of wireless communications networks include Bluetooth, Bluetooth Low Energy (BLE), and Wi-Fi Direct.

The vehicle communications network 122 supports formation of a network communicatively coupling the component nodes 119 and other potential nodes within the vehicle 105 included in the plurality of local blockchain nodes 200. In an example, the plurality of local blockchain nodes 200 is coupled in a peer-to-peer network, with each node in the peer-to-peer network connected to at least one other node. Initial nodes in the plurality of local blockchain nodes 200 may be specified by the vehicle 105 manufacturer and may be recorded in the local blockchain access ledger 125. FIG. 2 illustrates an example plurality of local blockchain nodes 200.

The plurality of local blockchain nodes 200 maintains the local blockchain access ledger 125. That is, the plurality of local blockchain nodes 200 may receive requests from time-to-time to add a node to the plurality of local blockchain nodes 200. The node may be, for example, a node embedded in a device (for example an entertainment device) that is being added to the vehicle 105. The nodes in the plurality of local blockchain nodes 200 evaluate the request. In case that the request is approved, the plurality of local blockchain nodes 200 adds the node to the plurality of local blockchain nodes 200 and adds a data block to the local blockchain access ledger 125 recording the addition.

Additionally or alternatively, the plurality of local blockchain nodes 200 may receive requests to authorize access to an the communications access port 118_CA on the vehicle 105 by a device such as an access device 143 or a personal device 144. The nodes in the plurality of local blockchain nodes 200 evaluate the request as described below. In case that the request is approved, the plurality of local blockchain nodes 200 adds a data block to the local blockchain access ledger 125 recording the authorization.

The local blockchain access ledger 125 is a distributed blockchain ledger. That is, each node in the plurality of local blockchain nodes 200, such as the component nodes 119, stores, e.g., in a memory, one copy of the local blockchain access ledger 125. The nodes of the plurality of local blockchain nodes 200 may, for example, receive data blocks from other nodes in the plurality of local blockchain nodes 200 and may upload the data blocks to the local blockchain access ledger 125, i.e., store the respective data blocks in respective storage locations in the local blockchain access ledger 125 such that each data block is linked to one respective previous data block. Each data block may specify vehicle network access via the communication access port 118_CA for a device. The data blocks may be generated based on requests, which may be submitted, for example, by an access device 143 over a CAN bus in the vehicle communications network 122. Each node in the plurality of local blockchain nodes 200 can compare its stored blockchain data, i.e., linked data blocks, to blockchains stored by other external blockchain nodes to verify the data blocks. For example, a first node in the plurality of local blockchain nodes 200 can generate a hash based on the data stored in a respective data block of a blockchain stored by a second node in the plurality of local blockchain nodes 200. In the case the hash generated by the first node matches the hash stored by the second node for the respective data block, the first node determines the data block is verified. The first node stores, e.g., in a computer memory, access authorization data, as described below, allocated to the access device.

The network 135 represents one or more mechanisms by which a vehicle computer 110 may communicate with remote devices, including devices hosting external blockchain nodes 142. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

In addition, the vehicle computer 110 may be configured for communicating via a vehicle-to-vehicle communication module or interface with devices outside of the vehicle 105, e.g., through a vehicle-to-vehicle (V2V) or vehicle-to-infrastructure (V2X) wireless communications to another vehicle, and/or to nodes in the plurality of global blockchain nodes 300 (typically via direct radio frequency communications). The communications module could include one or more mechanisms by which the computers 110 of vehicle 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE 802.11, dedicated short range communications (DSRC), and/or wide area networks (WAN), including the Internet, providing data communication services.

The network 135 includes mechanisms for communicatively coupling a plurality of global blockchain nodes 300. The plurality of global blockchain nodes 300 includes component nodes 119 and external blockchain nodes 142. In an example, the plurality of global blockchain nodes 300 is a peer-to-peer network, with each node in the peer-to-peer network connected to at least one other node. Initial nodes in the plurality of global blockchain nodes 300 may be specified by the vehicle 105 manufacturer and may be recorded in the global blockchain access ledger 141. An example plurality of global blockchain nodes 300 is shown in FIG. 3.

The plurality of global blockchain nodes 300 maintains the global blockchain access ledger 141. That is, the plurality of global blockchain nodes 300 may receive requests from time-to-time to add a node to the plurality of global blockchain nodes 300. The node may be, for example, an external node from a supplier of security related products or a supplier of data services. The nodes in the plurality of global blockchain nodes 300 evaluate the request. In case that the request is approved, the plurality of global blockchain nodes 300 adds the node to the plurality of global blockchain nodes 300 and adds a data block to the global blockchain access ledger 141 recording the addition.

Additionally or alternatively, the plurality of global blockchain nodes 300 may receive requests to authorize access to an the vehicle network 122 via the communications access port 118_CA on the vehicle 105 by a device such as an access device 143 or a personal device 144. The nodes in the plurality of global blockchain nodes 300 evaluate the request as described below. In case that the request is approved, the plurality of global blockchain nodes 300 adds a data block to the global blockchain access ledger 141 recording the authorization.

An external blockchain node 142 is a computing device in the plurality of global blockchain nodes 300 that stores one copy of the global blockchain access ledger 141. The plurality of global blockchain nodes 300 may support a plurality of external blockchain nodes 142, as shown in FIGS. 1 and 3. Each external blockchain node 142 is hosted on a conventional computing device, i.e., including one or more processors and one or more memories, programmed to provide operations such as described herein. The external blockchain nodes 142 can be accessed via the communications network 135. The computing device hosting each respective external blockchain node 142 may be associated with an entity that participates in maintaining the global blockchain access ledger 141, e.g., to verify data in the global blockchain access ledger 141, to store data on the global blockchain access ledger 141, etc. For example, an external blockchain node 142 may be hosted on a computer associated with a manufacturer of vehicles, a computer associated with an automotive supplier which manufactures vehicle components 118, a developer of intelligent communications access devices 143, etc.

The access device 143 is a computing device including a processor and a memory such as are known. The access device 143 may include programming to communicatively couple with a node in the plurality of global blockchain nodes 300 or the plurality of local blockchain nodes 200 and request access to the vehicle network 122 via the communications access port 118_CA. The access device 143 may request access for itself (the access device 143), or for another computing device. The access device 143 may include programming to perform proof of work, or respond to other challenges related to a request for access to the vehicle network 122 via the communications access port 188_CA. In some cases, the access device 143 may be a same device as a personal device 144 as described below.

The personal device 144 is a computing device including a processor and a memory as are known. The personal device 144 may include programming to establish or confirm trustworthiness with one or more nodes 142, 119 on one of the plurality of global blockchain nodes 300 or plurality of local blockchain nodes 200. Trustworthiness means, in this context, that the personal device 144 can establish a level of authorization to interact with the node 142, 119. For example, the personal device 144 may include a digital key that matches or is paired with a digital key on the node 142, 119. As another example, the personal device may have an identifier that is listed as an authorized device on the node 142, 119.

In an example, a user could download an application to the personal device 144 from an entity, such as a vehicle manufacturer, associated with a computing device hosting one of the external nodes 142. The application may, after authentication, may be programmed to pair with the plurality of blockchain nodes 300 by becoming a participating node and completing a proof of work challenge.

In some cases the personal device 144 may be a same device as an access device 143 as described above.

The global blockchain access ledger 141 is a distributed blockchain ledger. That is, each external blockchain node 142 and each component node 119 stores, e.g., in a memory, one copy of the global blockchain access ledger 141. The external blockchain nodes 142 and component nodes 119 may, for example, receive data blocks from other external blockchain nodes 142 and component nodes 119 and may upload the data blocks to their respective copies of the global blockchain access ledger 141, i.e., store the respective data blocks in respective storage locations in their respective global blockchain access ledgers 141. A data block in the global blockchain access ledger 141 may represent authorization for a device to access the communications access port 118_CA, and be generated based on a request from a computing device such as the access device 143. Each external blockchain node 142 can compare its stored blockchain data, i.e., linked data blocks, to blockchains stored by other external blockchain nodes 142, 119 to verify the data blocks. For example, each external blockchain node 142 or component node 119 can generate a hash based on the data stored in a respective data block of a blockchain stored by another external blockchain node 142 or component node 119. In the case the hash generated by the one external blockchain node 142 or component node 119 matches the hash stored by the other external blockchain node 142 component node 119 for the respective data block, the one external blockchain node 142 or component node determines the data block is verified. The external blockchain node 142 or component node stores, e.g., in a computer memory, access authorization data, as described below, allocated to access devices.

Figure 4:
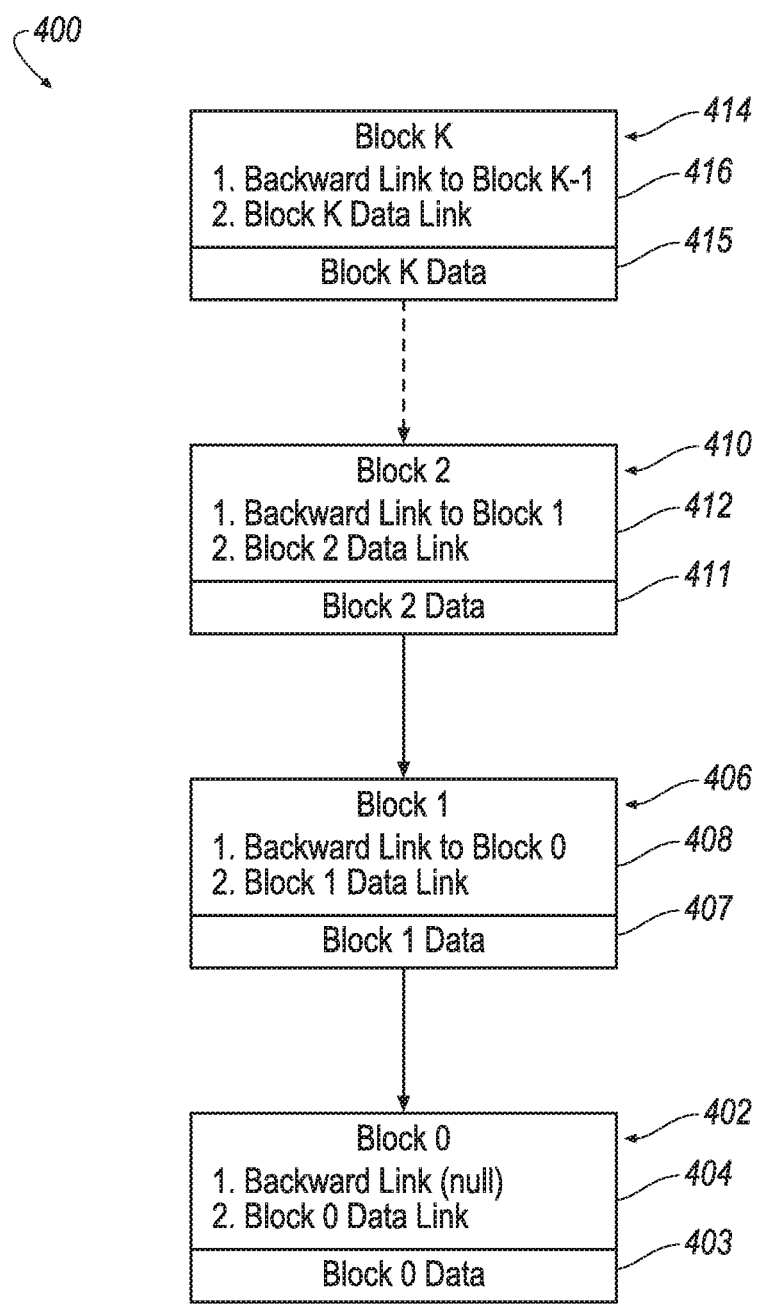
FIG. 4 is an example of a blockchain ledger.

FIG. 4 is an example of a blockchain 400 such as may be used for the local blockchain access ledger 125 and the global blockchain access ledger 141. The blockchain 400 includes a zero data block 402, a first data block 406, a second data block 410 and a kth block 414. The blocks are organized in a chain. The zero data block 402 is at a first, beginning end of the chain. The first data block 406 is linked to the zero data block 402. The second data block 410 is linked to the first data block 406. Each successive data block is linked to the previous data block. The kth data block 414, at a second end of the chain, is linked to the (k−1)th data block (not shown).

Each block includes a data portion and a linking portion as shown in Table 1.

| Data Block | Data Portion | Linking Portion |
|---|---|---|
| 402 | 403 | 404 |
| 406 | 407 | 408 |
| 410 | 411 | 412 |
| 414 | 415 | 416 |

The data portion includes data to be stored in the data block. The linking portion includes a link to the data portion, and, except for the zero data block, includes a link to the previous data block in the chain. For example, in the first data block 410, the data portion 411 stores data. The linking portion 412 includes a link "block 1 data link" that provides a link to the data portion 411. The linking portion 412 further includes a link "backward link to block 0" that provides a link to the linking portion of data block 0.

Figure 5A:
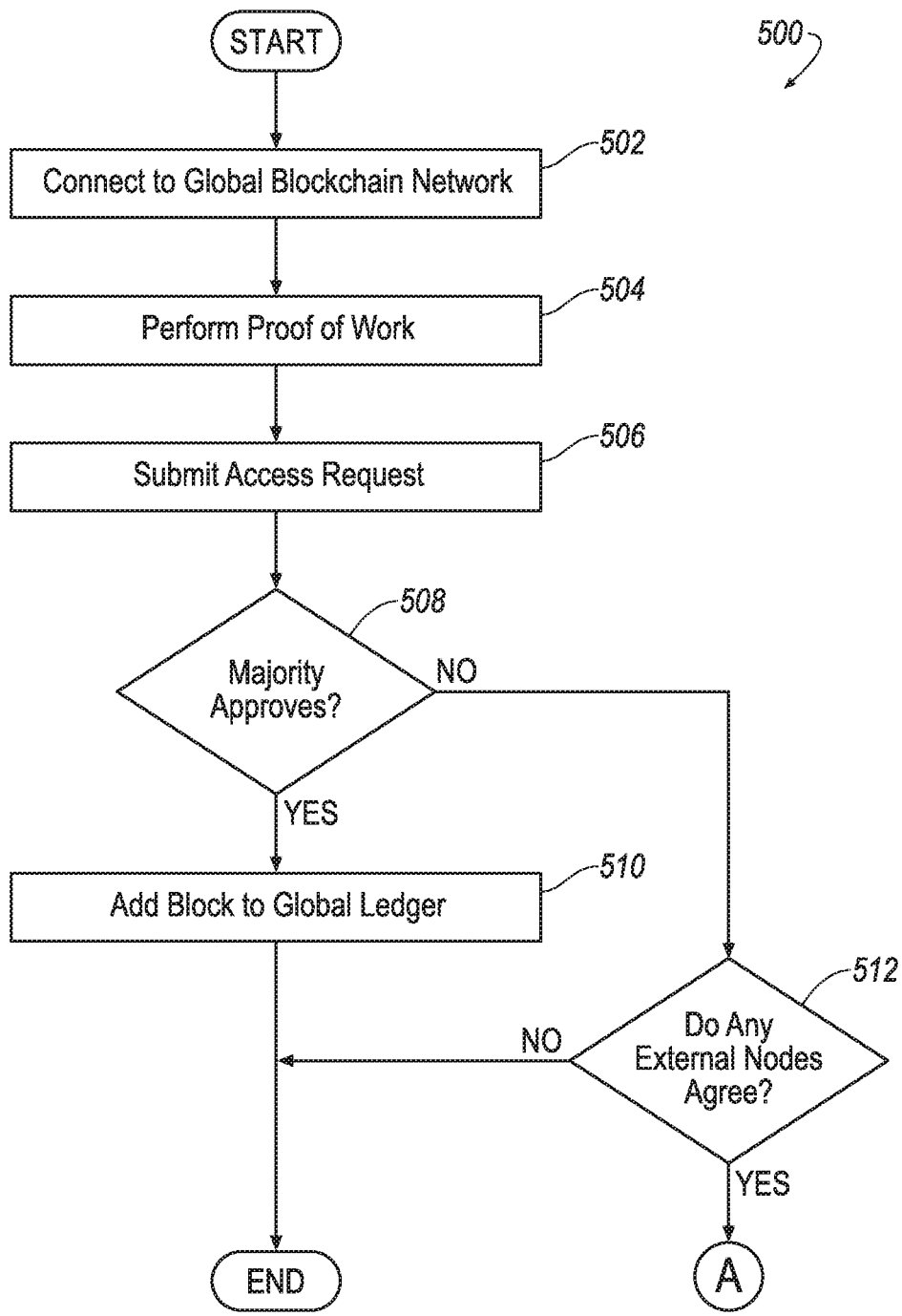
FIGS. 5A and 5B are a flow diagram of an example process for accessing a vehicle network via the communications access port.
Figure 5B:
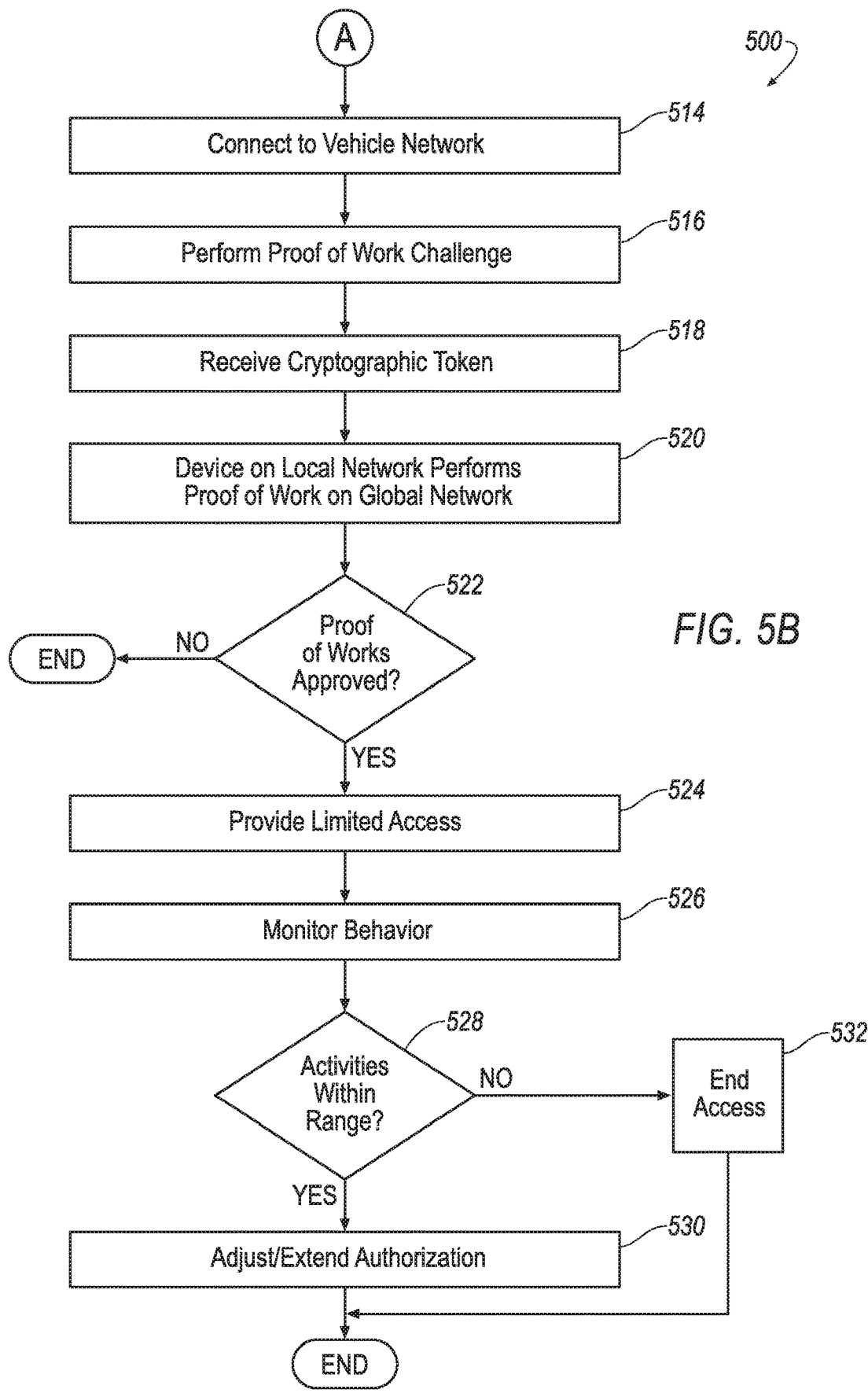

FIG. 5 is a diagram of an example process 500 for adding a data block to the global blockchain access ledger 141 and/or the local blockchain ledger 125. The process begins in a block 502.

In the block 502, an access device 143 communicatively couples to the plurality of global blockchain nodes 300. To communicatively couple with the plurality of global blockchain nodes 300, the access device 143 may, for example, establish, via the network 135, communications with one of the external nodes 142 included in the plurality of global blockchain nodes 300. Alternatively, in a case that the access device 143 is included in the vehicle 105, the access device 143 may establish, via the vehicle communications network 122, communications to one of the component nodes 119.

To establish communications, the access device 143 may send a request to open a communication channel to the respective external node 142 or component node 119. The request may include, for example, an identifier such as a serial number for the access device 143 and may also include a digital key. The respective external node 142 or component node 119 may then respond with an acknowledgement. The process 500 continues in a block 504.

In the block 504, the access device 143 submits a request to add a data block to the global blockchain access ledger 141. For example, the data block may specify access for the access device 143 or a device represented by the access device 143 to the vehicle network 122 via the communications access port 118_CA. The request may include, for example, an identifier of the computing device for which access is requested, types of access (read, limited write, full write, etc.), and a duration (continuous, fixed time period, for a single operation of the vehicle 10, etc.) that are requested. The process 500 continues in a block 506.

In the block 506, the access device 143 performs a proof of work or other response to a challenge. For example, the access device 143 may solve a hash puzzle. The access device 143 submits the proof of work to the nodes (external nodes 142 and component nodes 119) of the plurality of global blockchain nodes 300. The process 500 continues in a block 508.

In the block 508, the nodes (external blockchain nodes 142 and component nodes 119) of the global blockchain vote to accept or reject the proposed modification to the global blockchain access ledger 141. The result of the vote may be based on a majority of the nodes (i.e., the external blockchain nodes 142 and the component nodes 119) in the plurality of global blockchain nodes 300. Further, the result of the vote may be based on a weighted majority wherein each of the external blockchain nodes 142 and component nodes 119 are assigned weights. Each node may be allotted a vote with a predetermined weight (for example, stored in memory by the device manufacturer, or for aftermarket devices, stored in memory when the aftermarket device is added to the global blockchain access ledger 141). The weight may be predetermined, for example, based on a type of the node. As an example, an external node 142 associated with the vehicle manufacturer may have a higher predetermined weight than an external node associated with a supplier of components 118. As another example, a supplier of multiple components 118 to the vehicle manufacturer may have a higher predetermined weight than a supplier of a single component 118.

The nodes 142, 119 may evaluate the request and determine whether to accept or reject the request, i.e., how to vote on the request. The nodes 142, 119 perform the evaluation based on one or more criteria. A first criterion may be whether the access device 143 provided a correct proof of work. For example, in a case that the proof of work was to identify a number, that when added to a first data block, generates a second data block for which a hash function results in a hash with a specific quality, the node 142, 119 may confirm the result. That is, the node 142, 119 may add the number provided by the access device to the first data block to regenerate the second data block, and then apply the hash function to the second data block to determine that the resulting hash has the specific quality. In the case that the resulting hash has the specific quality, the node 142, 119 will vote to accept the request.

Additionally or alternatively, other criteria may be used to evaluate the request to determine whether to vote positively or negatively with respect to granting requested authorization. For example, a node 142, 119 may maintain a list of identifiers of devices that can be authorized (or, e.g., of suppliers of devices that can be authorized). The node 142, 119 may require that an identifier be supplied by the access devices 143 requesting access that appears on the list of identifiers that can be authorized and only accept requests from access devices 143 that supply such an identifier. As another example, additionally or alternatively to supplying proof of work and/or an authorized identifier, the access device 143 may be required to supply a digital key that matches or pairs with a digital key maintained by the node 142, 119. In the case that the access device 143 supplies the digital key, the node 142, 119 may accept the request. In a case that one or more of the criteria for acceptance by the node 142, 119 are not met, the node 142, 119 will vote to reject the request.

The nodes 142, 119 in the plurality of global blockchain nodes 300 may be joined in a peer-to-peer network, or a peer-to-peer network with a supervisory node which has some centralized authority. In a case that the nodes 142, 119 are joined in a peer-to-peer network without a supervisory node, each node 142, 119 may, transfer, from node 142, 119 to node 142, 119 the access request, with each node 142, 119 adding the node's respective vote (accept or reject) together with an identifier for the node 142, 119, based off of an address table. When a number of "accepts" exceeds a majority of a total number of possible votes, or a number of "rejects" exceeds the majority of the total number of possible votes, the request is respectively accepted or rejected.

In a case that the peer-to-peer network includes a supervisory node, the supervisory node may collect votes from each the other nodes 142, 119 and determine, based on a majority of the votes, whether the request is accepted or rejected. In this case, the supervisory node may maintain a list of identifiers and corresponding addresses of devices that are allowed to participate in a vote or other network activities.

In a case that the request to add the block to the global blockchain access ledger 141 is approved, the process 500 continues in a block 510 in which the global blockchain access ledger 141 is modified. Otherwise, the process 500 continues in a block 512.

In the block 510, global blockchain access ledger 141 is modified. Each node (external node 142, component node 119) in the plurality of global blockchain nodes 300 may modify the respective copy of the global blockchain access ledger 141 stored in memory of the node. The added data block can include a data portion including an identifier of the computing device for which access was requested and the specifying the access granted. The computing device for which access was requested may be, but is not necessarily, the access device 143 which initiated the access request. The block further includes a linking portion including a link to the data portion, and a link to the most recent previous block added to the global blockchain access ledger 141. Following addition of the block to the global blockchain access ledger 141, the process 500 ends.

In the block 512, which follows the block 508 in a case that a majority of nodes 142, 119 did not approve adding the block to the global blockchain access ledger 141, a determination is made whether any external node 142 approved the addition of the data block. For example, the node 142, 119 which submitted the initial request on behalf of the access device 143, may take a poll of the nodes 142, 119 and determine, based on the poll, that at least one external node 142 voted to approve adding the data block to the global blockchain access ledger 141. In a case that at least one of the external nodes 142 voted to approve the addition of the data block to the global blockchain access ledger 141, the process 500 continues in a block 514.

In the block 514, a personal device 144 may establish trustworthiness to communicate with at least one component node 119 in the plurality of local blockchain nodes 200. Establishing trustworthiness in this context means to establish some level of authorization to interact with the component node 119. For example, the personal device 144 may include a digital key that matches or is paired with a digital key on the component node 119. As another example, the personal device may have an identifier that is listed as an authorized device on the component node 119. To communicatively couple with the plurality of local blockchain nodes 200, the personal device 144 may establish communications with the component node 119 by, for example, sending a request over a CAN bus in the vehicle 105, together with the identifier and/or the digital key to the component node 119. The component node 119 may acknowledge the request. The acknowledgement may include, for example, a proof of work challenge. The process 500 continues in a block 516.

In the block 516, the personal device 144 may perform the proof of work challenge received from the plurality of local blockchain nodes 200. The process 500 continues in a block 518.

In the block 518, the personal device 144, or another computing device represented by the personal device 144, receives a cryptographic token based on the proof of work. A cryptographic token represents asset rights, managed by an underlying distributed ledger, and may include parameters such as an issuer, an issued-at time stamp, an expiration time, an authorized receiver of communications, and a general set of permissions. The process 500 continues in a block 520.

In the block 520, a component node 119 in the plurality of local blockchain nodes 200 performs a proof of work in the plurality of global blockchain nodes 300. For example, the component node 119 with which the personal device 144 has established trustworthiness can send a request to the plurality of global blockchain nodes 300 for limited access to the vehicle network 122 via the communications access port 118_CA for the personal device 144. An external node 142 in the plurality of global blockchain nodes 300 may respond by identifying a proof of work challenge to be met by the component node 119. The component node 119 may then perform the proof of work and provide the proof of work to the plurality of global blockchain nodes 300. The process 500 continues in a block 522.

In the block 522, the plurality of global blockchain nodes 300 votes to approve the proof of work submitted by the component node 119 in the plurality of local blockchain nodes 200. For example, the approval may be based on a weighted, majority vote, as described in reference to the block 508. In the case that the proof of work is approved, the process 500 continues in a block 524. Otherwise, the process 500 ends.

In the block 524, in the case that the plurality of global blockchain nodes 300 approved the proof of work, the plurality of local blockchain nodes 200 provides limited access the vehicle network via the communications access port 118_CA to the personal device 144. The plurality of local blockchain nodes 200 adds a data block to the local blockchain access ledger 125 recording and specifying the approved limited access. The data block may include an identifier of the device to which access was granted (the authorized device), and data specifying the limited access. For example, the access may be limited as to the number of systems on the vehicle 105 that can be accessed, the type (read, limited write, full write) of access, and may further be limited in duration. For example, the access may be limited to read and limited write access of one system in the vehicle 105 until the next time that the vehicle 105 is turned off or until a fixed time, such as the end of calendar day. The process 500 continues in a block 526.

In the block 526, the plurality of local blockchain nodes 200 (e.g., a component node 119 in the plurality of local blockchain nodes 200 such as the communications access port node 199_CA) monitors activity of the authorized device. The term "activity of the authorized device," as used herein means the messages sent by the authorized device, the components 118 and other vehicle systems to which the commands were addressed, and a time during which the messages were sent. For example, the plurality of local blockchain nodes 200 may record the commands transmitted on a CAN bus in the vehicle network 122 by the authorized device. The process 500 continues in a block 528.

In the block 528, the plurality of local blockchain nodes 200 (e.g., a component node 119 in the plurality of local blockchain nodes 200), determines whether the activities of the authorized device remained within a predetermined range of activities. The predetermined range of activities may be, for example, the access conditions for the authorized device as specified in the data block authorizing the authorized device. These access conditions may limit the activities of the authorized device to components 118 and/or other vehicle systems with which the authorized device can interact, a type of interaction (reading, limited writing, full writing), and a period of time during which the authorized device can interact with the components 118 and/or other vehicle systems.

For example, in the case that the access granted was limited to one system in the vehicle 105, the plurality of local blockchain nodes 200 may determine whether the authorized device limited commands to the one system, or whether the authorized violated the specified conditions, and attempted to send commands to other vehicle systems. As another example, if the access was limited to a timeframe, the plurality of local blockchain nodes 200 may determine whether the authorized device limited activity to the timeframe.

In the case that the authorized device complied with the predetermined standards, the process continues in a block 530. The authorized device may be granted additional access. Otherwise, the process continues in the block 532.

In the block 530, the plurality of local blockchain nodes 200 and/or the plurality of global blockchain nodes 300 may grant the authorized device additional access rights. For example, the access rights may be increased to be continuous, or may be increased to include additional vehicle systems. An appropriate data block is added to the local blockchain access ledger 125 and/or the global blockchain access ledger 141. The process 800 ends.

In the block 532, in the case that the authorized device did not fully comply with the predetermined standards, the access may end as specified in the limited access. For example, the access may end at the next time when the vehicle is turned off. The process 532 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
a first plurality of blockchain nodes including first network nodes external to a vehicle and second network nodes connected to each other on a vehicle network internal to the vehicle, the first plurality of blockchain nodes maintaining a first distributed blockchain ledger;
a second plurality of blockchain nodes including the second network nodes internal to the vehicle and not including the first network nodes external to the vehicle, the second plurality of blockchain nodes maintaining a second distributed blockchain ledger;
a first computing device, the first computing device including a processor and a memory, the memory including instructions such that the processor is programmed to:
transmit a first request to the first plurality of blockchain nodes requesting access to the vehicle network via a diagnostic access port in the vehicle for the first computing device or another computing device;
demonstrate a first proof of work by responding to a second request from the first plurality of blockchain nodes; and
receive, based on a first majority of the first network nodes and the second network nodes in the first plurality of blockchain nodes accepting the first request, first authorization specifying access to the vehicle network via the diagnostic access port; and a second computing device recognized as trusted by at least one node in the second plurality of blockchain nodes, the second computing device including a second processor and a second memory, the second memory including instructions such that the processor is programmed to:

transmit a third request to the second plurality of blockchain nodes requesting access to the vehicle network via the diagnostic access port;

demonstrate a second proof of work by responding to a fourth request from the second plurality of blockchain nodes;

receive a cryptographic token from one of the second network nodes based on the one of the second network nodes providing a third proof of work by responding to the third request from the first plurality of blockchain nodes; and receive, based on (1) a second majority of the second network nodes in the second plurality of blockchain nodes accepting the third request, and (2) the received cryptographic token, second authorization authorizing access to the vehicle network via the diagnostic access port.

2. The system of claim 1, wherein access to the vehicle network via the diagnostic access port includes at least one of (1) access to at least some data on the vehicle network and (2) access to communicate with at least one vehicle system on the vehicle network.

3. The system of claim 1, wherein each of the first plurality of blockchain nodes are programmed to add a data block to the first distributed blockchain ledger recording the first authorization based on the first majority of the first network nodes and the second network nodes accepting the first proof of work.

4. The system of claim 1, wherein the second request from the first plurality of blockchain nodes is a hash puzzle.

5. The system of claim 1, wherein accepting the first request includes accepting the first proof of work.

6. The system of claim 1, wherein the second plurality of blockchain nodes, based on (1) the second majority of the second network nodes in the second plurality of blockchain nodes accepting the third request, and (2) the received cryptographic token, is programmed to add a data block to the second distributed blockchain ledger recording the second authorization.

7. The system of claim 1, wherein transmitting the third request to the second plurality of blockchain nodes is based on the first majority of the first network nodes and the second network nodes in the first plurality of blockchain nodes not accepting the first proof of work.

8. The system of claim 1, wherein, to establish that the second computing device is recognized as trusted by the at least one node on the second plurality of blockchain nodes, the second processor is programmed to transmit at least one of (1) an identifier of the second computing device recognized by the at least one node on the second plurality of blockchain nodes or (2) a first digital key matching to or pairing with a second digital key stored on the at least one node on the second plurality of blockchain nodes.

9. The system of claim 1, wherein the second authorization is limited in duration, and the first plurality of blockchain nodes is further programmed to:

monitor activity of the second computing device during the duration of the second authorization; and adjust or extend the specified access to the vehicle network via the diagnostic access port based on determining that the activity of the second computing device remained within a predetermined range of activities during the duration of the second authorization.

10. A method comprising:

transmitting, by a first computing device, a first request to a first plurality of blockchain nodes requesting access to a vehicle network via a diagnostic access port in a vehicle for the first computing device or another computing device, wherein the first plurality of blockchain nodes includes first network nodes external to the vehicle and second network nodes connected to each other on a vehicle network included in the vehicle, and the first plurality of nodes maintains a first distributed blockchain ledger;

demonstrating a first proof of work by responding to a second request from the first plurality of blockchain nodes;

receiving, based on a first majority of the first network nodes and the second network nodes in the first plurality of blockchain nodes accepting the first request, first authorization specifying access to the vehicle network via the diagnostic access port;

transmitting, by a second device recognized as trusted by at least one node in a second plurality of blockchain nodes, a third request to the second plurality of blockchain nodes requesting access to the vehicle network via the diagnostic access port, wherein the second plurality of blockchain nodes includes the second network nodes included in the vehicle and does not include the first network nodes external to the vehicle and the second plurality of blockchain nodes maintains a second distributed blockchain ledger;

demonstrating a second proof of work by responding to a fourth request from the second plurality of blockchain nodes;

receiving a cryptographic token from one of the second network nodes based on the one of the second network nodes providing a third proof of work by responding to the third request from the first plurality of blockchain nodes; and receiving, based on (1) a second majority of the second network nodes in the second plurality of blockchain nodes accepting the third request, and (2) the received cryptographic token, second authorization authorizing access to the vehicle network via the diagnostic access port.

11. The method of claim 10, wherein access to the vehicle network via the diagnostic access port includes at least one of (1) access to at least some data on the vehicle network and (2) access to communicate with at least one vehicle system on the vehicle network.

12. The method of claim 10, wherein each of the first plurality of blockchain nodes are programmed to add a data block to the first distributed blockchain ledger recording the first authorization based on the first majority of the first network nodes and the second network nodes accepting the first proof of work.

13. The method of claim 10, wherein the second request from the first plurality of blockchain nodes is a hash puzzle.

14. The method of claim 10, wherein accepting the first request includes accepting the first proof of work.

15. The method of claim 10, wherein the second plurality of blockchain nodes, based on (1) the second majority of the second network nodes in the second plurality of blockchain nodes accepting the third request, and (2) the received cryptographic token, is programmed to add a data block to the second distributed blockchain ledger recording the second authorization.

16. The method of claim 10, wherein transmitting the third request to the second plurality of blockchain nodes is based on the first majority of the first network nodes and the second network nodes in the first plurality of blockchain nodes not accepting the first proof of work.

17. The method of claim 10, wherein, to establish that the second computing device is recognized as trusted by the at least one node on the second plurality of blockchain nodes, the second processor is programmed to transmit at least one of (1) an identifier of the second computing device recognized by the at least one node on the second plurality of blockchain nodes or (2) a first digital key matching to or pairing with a second digital key stored on the at least one node on the second plurality of blockchain nodes.

18. The method of claim 10, further comprising:
monitoring, by the first plurality of blockchain nodes, activity of the second computing device during the duration of the second authorization, wherein the second authorization is limited in duration; and
adjusting or extending the specified access to the vehicle network via the diagnostic access port based on determining that the activity of the second computing device remained within a predetermined range of activities during the duration of the second authorization.

* * * * *